United States Patent [19]
Abe et al.

[11] Patent Number: 5,988,822
[45] Date of Patent: Nov. 23, 1999

[54] LUMINOUS RETROREFLECTIVE SHEETING AND METHOD FOR MAKING SAME

[75] Inventors: Hidetoshi Abe, Tendo; Yoshinori Araki, Sagae, both of Japan

[73] Assignee: 3M Innovative Properties Company, St. Paul, Minn.

[21] Appl. No.: 09/195,891

[22] Filed: Nov. 19, 1998

[51] Int. Cl.[6] .................................................. G02B 5/128
[52] U.S. Cl. ........................ 359/541; 359/536; 359/538; 359/539; 359/540; 359/542
[58] Field of Search ..................... 359/534–543, 359/546–548; 428/143, 204, 203, 325, 913; 40/441, 442, 542–544, 582, 583, 612

[56] References Cited

U.S. PATENT DOCUMENTS

| | | |
|---|---|---|
| 2,407,680 | 9/1946 | Palmquist et al. . |
| 2,592,882 | 4/1952 | Fisher et al. . |
| 2,963,378 | 12/1960 | Palmquist et al. . |
| 3,025,764 | 3/1962 | McKenzie . |
| 3,190,178 | 6/1965 | McKenzie . |
| 3,253,146 | 5/1966 | De Vries . |
| 3,420,597 | 1/1969 | Nellessen et al. . |
| 3,830,682 | 8/1974 | Rowland . |
| 4,005,538 | 2/1977 | Tung . |
| 4,025,159 | 5/1977 | McGrath . |
| 4,367,920 | 1/1983 | Tung et al. . |
| 5,237,448 | 8/1993 | Spencer et al. . |
| 5,243,457 | 9/1993 | Spencer . |
| 5,300,783 | 4/1994 | Spencer et al. . |
| 5,315,491 | 5/1994 | Spencer et al. . |
| 5,415,911 | 5/1995 | Zampa et al. . |
| 5,759,671 | 6/1998 | Tanaka et al. ........................ 359/536 |

FOREIGN PATENT DOCUMENTS

| | | |
|---|---|---|
| 747 736 | 12/1996 | European Pat. Off. . |
| 60-205501 | 10/1985 | Japan . |
| 5-173008 | 7/1993 | Japan . |
| 6-160615 | 6/1994 | Japan . |
| 6-287917 | 10/1994 | Japan . |
| 7-84109 | 3/1995 | Japan . |
| 7-218708 | 8/1995 | Japan . |
| 8-129351 | 5/1996 | Japan . |
| 1034037 | 6/1966 | United Kingdom . |
| 01735 | 1/1996 | WIPO . |
| WO 98/20375 | 5/1998 | WIPO . |
| WO 98/53645 | 11/1998 | WIPO . |

*Primary Examiner*—James Phan
*Attorney, Agent, or Firm*—Stephen C. Jensen

[57] ABSTRACT

Luminous retroreflective sheetings have a transparent cover layer, an optical layer disposed beneath the cover layer, and a reflective layer. The optical layer includes a first polymer layer and a monolayer of beads at least partially embedded therein. The reflective layer is disposed proximate a focal plane of the monolayer of beads. The monolayer of beads includes transparent beads that, in combination with the reflective layer, retroreflect incident light. The monolayer also includes light-emitting beads that emit light under the influence of an applied voltage or ultraviolet (UV) radiation. Processes for making such sheetings are also disclosed.

13 Claims, 1 Drawing Sheet

LUMINOUS RETROREFLECTIVE SHEETING AND METHOD FOR MAKING SAME

CROSS REFERENCE TO RELATED APPLICATION

The present invention claims priority under 35 U.S.C. 119 to Japanese Patent Application Serial No. 321273/1997, "Self Light-Emitting Retroreflective Sheet and Method For Producing The Same", filed Nov. 21, 1997.

BACKGROUND

The present invention relates generally to so-called beaded retroreflective sheeting. More particularly, the invention relates to such sheeting that, in addition to being retroreflective, is also luminous in that it emits self-generated light. The self-generated light is preferably electroluminescent ("EL") in nature.

The reader is directed to the glossary at the end of the specification for guidance on the meaning of certain terms used herein.

Retroreflective sheeting can be used in a variety of end uses, such as highway signs and markers, license plates, advertising boards, truck conspicuity markers, clothing, security applications, and the like. Most such sheeting can generally be classified as cube corner sheeting or beaded sheeting, according to the structure responsible for retroreflection: in cube corner-type sheeting, faces formed on a structured surface are arranged to form elements in which three neighboring faces are approximately mutually perpendicular so as to produce retroreflection; in beaded-type sheeting, a multitude of miniature transparent beads focus incident light onto a reflective surface, the reflected light then passing back through such beads towards the source of the incident light. The present application is directed to the broad category of beaded sheeting, which includes a wide variety of known constructions.

In some constructions, referred to as enclosed lens constructions, the beads are substantially fully embedded in one or more polymeric layers. In these constructions, retroreflectivity of the sheeting will not be destroyed if a film of water forms on top of such layers. See, e.g., U.S. Pat. No. 2,407,680 (Palmquist et al.), U.S. Pat. No. 4,367,920 (Tung et al.). In other constructions, referred to as exposed lens constructions, the beads are partially embedded in a polymeric layer and partially exposed to air or vacuum. The retroreflectivity of these latter constructions can be eliminated or greatly diminished if a film of water were to form on the exposed portions of the beads. Therefore, many exposed lens constructions include an additional cover layer to encapsulate the exposed beads in sealed cells. See, e.g., U.S. Pat. No. 3,190,178 (McKenzie), U.S. Pat. No. 4,025,159 (McGrath).

Various attempts have been made to provide beaded retroreflective sheeting with luminous characteristics. These attempts have various drawbacks associated with the separate manner in which the luminous agents and the retroreflective agents are incorporated into the article. For example, in JP-A-60-205501 (Hiroshi et al.), a bead layer comprises a resin film containing beads as well as small particles of light accumulative pigment. Below the bead layer is a reflective layer comprising a resin film containing a fluorescent pigment and mica titanium. The relatively large beads and relatively small light accumulative pigment particles are dispersed in the resin film that forms the bead layer. This layer is formed by coating and drying the dispersion, and in practice almost all the surfaces of the beads would become covered with the light accumulative particles, tending to degrade retroreflectivity. It then becomes necessary to reduce the amount of light accumulative particles enough to keep the retroreflectivity at an acceptable level. The resulting tradeoff between retroreflectivity and luminescent brightness is inefficient because of the fashion in which the beads, the light accumulative pigment, and the luminescent particles are distributed. Fabrication is also complicated because of difficulties dispersing small particles uniformly in a matrix resin solution, such particles tending to sink or float in a layer of such solution prior to hardening.

Luminous retroreflective sheetings would benefit from more efficient distribution of retroreflective and luminous agents. Desired sheeting constructions would require only slight modifications to existing manufacturing processes used to make purely retroreflective sheetings, and would thus be compatible with relatively simple production steps and low production costs.

BRIEF SUMMARY

According to one aspect of the invention, luminous retroreflective sheetings are disclosed which have a transparent cover layer, an optical layer disposed beneath the cover layer, and a reflective layer. The optical layer includes a first polymer layer and a monolayer of beads at least partially embedded therein. The reflective layer is disposed proximate a focal plane of the monolayer of beads. The monolayer of beads includes transparent beads that in combination with the reflective layer serve to retroreflect incident light. The monolayer also includes light-emitting beads that emit light under the influence of an external agent, such as an applied voltage or ultraviolet (UV) radiation.

The transparent beads and light-emitting beads are preferably present in the monolayer in relative amounts between about 10 and 90%, measured as a volume ratio, and are similarly sized. In one embodiment, the optical layer further includes a second polymer layer, the monolayer of beads being partially embedded in both the first and second polymer layers. Further, in such embodiment the cover layer comprises a transparent electrode layer, and the reflective layer is electrically conductive. The light-emitting beads can thus be activated by applying an electric potential across the transparent electrode layer and reflective layer, without disturbing the retroreflective characteristics of the sheeting. Other embodiments are also disclosed.

According to another aspect of the invention, a process is disclosed in which beads are scattered in a monolayer on a first coating composition containing a first polymer. Significantly, the scattered beads include both transparent beads and light-emitting beads. The first coating composition is then solidified to form a first polymer layer with the monolayer of beads at least partially embedded therein. The method also includes forming a reflective film substantially along a focal plane of the monolayer of beads.

In one embodiment, the forming a reflective film step includes applying a second coating composition containing a second polymer to exposed portions of the monolayer of beads, solidifying the second coating composition to form a second polymer layer having a surface disposed substantially at the focal plane, and applying the reflective film to such surface.

Figure 1:
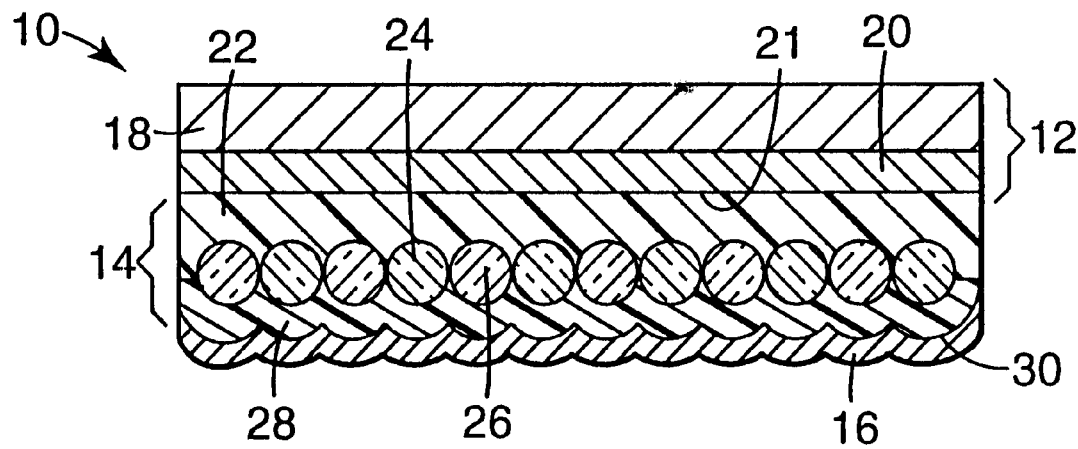
FIG. 1 is a side sectional view of a luminous retroreflective sheeting of enclosed lens construction, incorporating light-emitting beads to provide self-illumination and transparent beads to provide retroreflection.

In the drawings, the same reference symbol is used for convenience to indicate elements that are the same or that perform the same or a similar function.

DETAILED DESCRIPTION OF THE ILLUSTRATIVE EMBODIMENTS

In FIG. 1, a sheeting 10 is shown greatly magnified in cross-section, and is not to scale. The sheeting can be considered as made up generally of a transparent cover layer 12, an optical layer 14, and a reflective layer 16. Additional layers not shown in FIG. 1 can also be used, such as patterned polymeric films or pigments that define graphics, symbols, or indicia, disposed on top of cover layer 12, as well as a pressure-sensitive adhesive and release liner applied to reflective layer 16 to permit the sheeting to be readily applied to a desired substrate. Heat-sensitive, curable, polymerization type, solvent-evaporation type adhesives can alternatively be used.

In one method of constructing sheeting 10, a protective top film 18 is first provided. Film 18 is made of a resin having a light transmission of at least 70%, preferably at least 80%, and more preferably at least 90%, measured at the design wavelength. The light transmission of film 18 and other layers of sheeting 10 are preferably relatively high, so that light retroreflected from a distant source (two passes) and light generated from the light-generating beads (one pass) is minimally degraded. Examples of such a resin for film 18 are suitable acrylic resins, polyvinylidene fluoride resins, polymer blends of acrylic resins and polyvinylidene fluoride resins, polyesters, polyurethanes, vinyl chloride resins, polycarbonate, polyamide, polyvinyl fluoride resins, polyolefin resins, and the like. If desired, such resins may contain additives such as UV light absorbers, moisture-absorbers, colorants (including luminescent dyes), phosphorescent materials, heat stabilizers, fillers, and the like, insofar as the effects of the present invention are not impaired. For example, a fluorescent dye which develops a complimentary color to the color of the light emitted from the optical layer may in some instances be added to the transparent substrate, so that white light is observed.

In all, the thickness of cover layer 12 is usually in the range of between about 10 µm and about 1000 µm. Such layer can comprise a multilayer film having two or more resin layers, insofar as the effects of the disclosed embodiments are not substantially impaired.

Where EL-type light-emitting beads are used, a transparent electrode layer 20 is then preferably applied to top film 18 and incorporated in the cover layer 12. Transparent electrode layer 20 can be prepared by any conventional means, for example by vapor deposition, sputtering, paste coating, or the like directly on the surface of top film 18. Alternatively, electrode layer 20 can be applied to optical layer 14 and then top film 18 can be laminated thereto. Layer 20 can comprise known transparent electrode materials, such as an indium-tin oxide ("ITO") film, and like materials. Layer 20 has a thickness preferably between about 5 µm and about 1000 µm, and a surface resistivity preferably of between about 100 and 500 Ω/square, and more preferably between about 200 and 300 Ω/square. The light transmission of layer 20 is typically at least 70%, and preferably at least about 80%.

The optical layer 14 can then be formed as follows. First, a coating composition for forming a first polymer layer 22 is applied on the surface 21 of cover layer 12. The coating composition can be prepared using conventional mixing and kneading apparatuses such as homomixers, sand mills, planetary mixers, and the like. The coating composition is applied using applicators such as bar coaters, roll coaters, knife coaters, die coaters, and the like. Before solidification of the coating composition, a mixture of beads 24,26 is scattered on the coating composition by a conventional powder coating method, and partly embedded in the coating composition. The coating composition is then solidified. In this way a monolayer of beads partly embedded in the first polymer layer 22 and in contact therewith is formed.

Drying conditions depend on the kind of solvent used for the coating composition and the solids content, and may include temperatures typically ranging between room temperature and 150 degrees C., and drying times typically between five seconds and one hour. The solids content of the coating composition is usually between about 5 and 80 wt. %. Conventional organic solvents can be used so that the first polymers can be homogeneously dissolved therein.

The beads are embedded in the first polymer layer such that usually 1 to 99%, preferably 10 to 90%, and more preferably 20 to 80% of the vertical length of each particle (i.e., the diameter for substantially spherical beads) is embedded in the first polymer layer. If embedment is less than 1%, the layer integrity may be compromised in later processing steps. If embedment exceeds 99%, the uniformity of the bead monolayer tends to become unacceptable.

Next, a second polymer layer 28 is formed on the exposed portion of the bead monolayer to form optical layer 14 in which the first polymer layer 22, the monolayer of beads 24,26, and the second polymer layer 28 are in contact with each other. The second polymer layer 28 can be formed by applying and drying a coating composition containing materials for the second polymer layer, in the same way as the formation of the first polymer layer. Alternatively, the first and second polymer layers can be formed by heating the materials containing the respective polymers to make them flowable, allowing them to solidify by cooling, or by a method using a coating composition containing a radiation curable resin and solidifying them by irradiation. Second polymer layer 28 preferably has a thickness selected according to its refractive index such that it has a rear surface 30 that substantially follows a focal plane associated with transparent beads 24. The focal plane position can depend upon the size and refractive index of the beads, as well as the refractive index of first and second polymer layers 22,28. As shown, surface 30 is dimpled in conformity with the monolayer of beads. Methods for forming layer 28 in this dimpled configuration are known, and are used in the production of conventional enclosed lens retroreflective sheeting.

Polymers having high light transmission are suitable for the formation of the first and second polymer layers. Examples are suitable acrylic resins, polyvinylidene fluoride resins, polymer blends of acrylic resins and polyvinylidene fluoride resins, polyesters, polyurethanes, vinyl chloride resins, polyimide, polyolefin resins, epoxy resins, and the like. The thickness of the first polymer layer is typically between about 3 and about 1000 µm, and the thickness of the second polymer layer is typically between about 2 and about 1000 µm. The first and second polymer layers may be formed from different polymers or, for simplified processing, from the same polymers. If EL light-emitting beads are used, the layers 22,28 preferably have a high dielectric constant. In this context, high dielectric constant means a dielectric constant of at least about 5, preferably between 7 and 25, more preferably between 8 and 18, when measured by applying an alternating current of 1 kHz. If the dielectric constant is too low, the brightness of emitted light may suffer. When the dielectric constant is too high, the life of the optical layer tends to shorten. Examples of the polymers having a high dielectric constant are vinylidene fluoride resins, cyanoresins, and the like. For example, the vinylidene fluoride resin may be a homopolymer of vinylidene chloride or copolymers obtained by the copolymerization of vinylidene fluoride and at least one other fluorine-containing monomer. Examples of the other fluorine-containing monomer are tetrafluoroethylene, trifluorochloroethylene, trifluoroethylene, hexafluoropropylene, and the like. Examples of the cyanoresin are cyanoethylcellulose, cyanoethylated ethylene-vinyl alcohol copolymer, and the like. The first and second polymer layers can comprise the aforementioned polymers, but they may also include additives such as other resins, fillers, surfactants, UV light absorbers, antioxidants, anti-fungus agents, rust preventives, moisture absorbers, colorants, phosphorescent materials, etc. For example, if the emitted light from the bead monolayer is blue-green, the polymer layers may contain red or pink fluorescent dyes such as rhodamine 6G, rhodamine B, perylene dyes, etc. to give an appearance of white light.

Each of the first and second polymer layers may be composed of two or more sub-layers, insofar as the effects of the present invention are not impaired.

In a final step, reflective layer 16 is applied to rear surface 30 in direct contact with second polymer layer 28. If EL beads are used in the bead monolayer, layer 16 is preferably continuous and electrically conductive so that it can be used as an electrode to excite the EL beads. Suitable materials include aluminum, silver, and chromium films, applied by vapor deposition or sputtering techniques, or as a metal foil. A transparent layer such as an ITO film may also be included as a sub-layer. Dielectric materials such as cryolite, ZnS, or the like can also be used if electrical conductivity is not required. The thickness of layer 16 is typically between about 5 nm and about 100 μm.

Significantly, the beads scattered onto the first coating composition comprise a mixture of transparent beads 24 and light-emitting beads 26. Hence, the sheeting produced is both retroreflective, by virtue of beads 24 acting in cooperation with reflective layer 16, and self-luminous, by virtue of beads 26. Moreover, both types of beads are arranged in a single monolayer such that light-emitting beads 26 do not cover or otherwise interfere with the efficient operation of beads 24, and vice versa.

Transparent beads 24 can comprise any transparent beads used in conventional retroreflective beaded sheeting. Inorganic glass beads, ceramic beads, glass-ceramic beads, and the like can be used.

Beads 24 can have a refractive index of between about 1.4 and 4.0. When the refractive index of beads 24 is less than about 1.4, the distance from the beads to the focal plane becomes quite large, unacceptably increasing the thickness of second polymer layer 28 and of sheeting 10, making handling and production of the sheeting difficult. Also, light absorption by the layer 28 tends to increase and the retroreflective brightness tends to decrease. In cases where EL beads are used, light-emitting luminance tends to deteriorate due to the increased distance between transparent electrode layer 20 and reflective layer 16. Although beads 24 having a refractive index greater than 4.0 may be used, it becomes difficult to find beads having such a high refractive index and also high transparency, thus giving rise to decreased retroreflective brightness values.

Thus, a preferred range of refractive index is from about 1.5 to about 3.0. Beads 24 having different refractive indices within this range can be mixed and incorporated in the monolayer, with the light-emitting beads 26, to provide wide observation angle characteristics. Within the stated range, beads having an index of about 2.3 are easily produced.

The size of beads 24 is typically in the range of about 15 and 200 μm, and preferably between about 30 and about 100 μm. If the bead size is too small, the retroreflective brightness tends to decrease. If the bead size is too large, the thickness of the various component layers of the sheeting also become too large, resulting in the drawbacks discussed above. The size of light-emitting beads 26 is preferably about the same as that of the transparent beads 24.

The light-emitting beads 26 can be the type that emit self-generated light by electrical excitation (EL beads), by optical excitation such as ultraviolet light (phosphorescent beads), or by excitation by other known external agents. EL materials used in the light-emitting layer of conventional EL devices can be used, such as single substances of fluorescent compounds including ZnS, CdZnS, ZnSSe, and CdZnSe, or mixtures of such compounds and auxiliary components including Cu, I, Cl, Al, Mn, $NdF_3$, Ag, and B. Phosphorescent materials, such as "N YAKO" brand materials, which have an energy-storage mechanism that produces a long time afterglow, or catalog No. A-180 material, which emits blue light, both available from Nemoto Special Chemicals, can also be used. The typical particle sizes for beads 26 is between about 5 and 200 μm, and is preferably between about 15 and about 100 μm. Light-emitting beads on which a coating film of glass, ceramics, and the like is formed are also useable.

The beads 26 can comprise two or more kinds of light-emitting beads. For example, beads having discrete blue, blue-green, and orange emission spectra can be mixed to produce a combined output that approximates white light. Beads 26 can be transparent or opaque. If they are sufficiently transparent, and have a refractive index in the ranges discussed above, they can have the dual function of being both light-emitting and retroreflective.

The retroreflecitve brightness and the light-emitting luminance reach acceptable levels when the volume ratio of transparent beads 24 to light-emitting beads 26 is between about 10:90 and about 90:10. The volume ratio can be selected from this range depending upon whether retroreflectance or self-luminance is more important. In outdoor display applications such as traffic signs, the volume ratio is preferably between about 20:80 and about 80:20, and even more preferably between about 30:70 and about 70:30.

The use of optically-excited phosphorescent beads for beads 26 enables a simplified sheeting construction since no electrode layers, and no electrical connections to the sheeting, are required. However, EL beads are advantageous because they can typically achieve higher light-emitting luminance than phosphorescent beads. Regardless of the type of light-emitting bead chosen, the sheeting constructions disclosed herein can be made with production techniques similar to those used in the construction of conventional beaded retroreflective sheeting, and avoids the need to laminate together a separately formed light-emitting device and retroreflective device.

Figure 2:
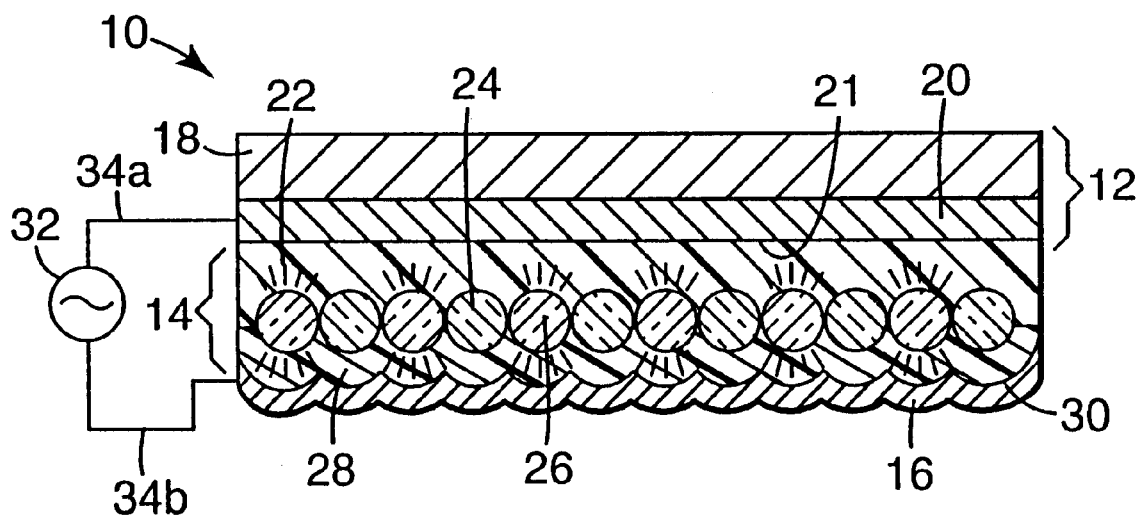
FIG. 2 depicts the sheeting of FIG. 1, wherein the light-emitting beads are electroluminescent such that connection to an electrical power source causes them to emit light.

FIG. 2 shows sheeting 10 in which light-emitting beads 26 are EL-type. An electrical power source 32 couples to transparent electrode layer 20 and reflective layer 16 via terminals 34a,34b respectively. As shown, beads 26 emit light in response to the applied signal. Source 32 can comprise a dry cell, battery, solar cell, or the like coupled to an inverter that changes direct current to alternating current, and that can adjust the rms voltage. The applied electrical signal has a frequency of typically between about 50 and about 1000 Hz, and an amplitude of between about 2 and about 200 Vrms.

Alternative embodiment luminous retroreflective sheetings can be made according to the principles outlined above. For example, an exposed lens sheeting can be made by eliminating the transparent electrode layer 20 from the cover layer and eliminating the first polymer layer 22 from the optical layer 14, and by spacing the cover layer 12 apart from the bead monolayer except along a network bonds to create a plurality of enclosed cells. In such case reflective layer 16 may be applied directly to the beads themselves, depending upon the refractive index of the beads and thus the position of the focal plane, either before or after formation of the bead monolayer. The simplified construction process and improved efficiency associated with the monolayer of transparent beads and light-emitting beads will still be realized.

EXAMPLE 1

On a transparent cover layer comprising a top film of a polyethylene terephthalate (PET) film and a transparent electrode layer (TETLIGHT TCF KPC300-75 (A) available from Oike Industries), an optical layer and an electrically conductive reflective layer were laminated in this order by the following method so that all the layers were in contact with each other, and an EL light-emitting retroreflective sheet was obtained. The transparent electrode layer was composed of ITO having a thickness of about 50 nm and a surface resistivity of about 250 Ω/square.

First, a coating composition for forming a first polymer layer was prepared by mixing and uniformly dissolving a polymer having a high dielectric constant (a tetrafluoroethylene-hexafluoropropylene-vinylidene fluoride copolymer "THV 200 P" available from 3M Company, having a dielectric constant at 1 kHz of 8 and a light transmission of 96%) in ethyl acetate with a homomixer. The solids content of the coating composition was about 25 wt. %.

This coating composition was applied on the ITO layer of the above PET film using a knife coater. Just after the application, a mixture of simple glass beads and light-emitting beads in a volume ratio of 48:52 were scattered in a substantially single layer state, and embedded so that about 50% of the diameter of each particle sank in the paint. Then, the paint was dried at about 65° C. for about one minute. The total thickness of the first polymer layer and bead monolayer was about 40 $\mu$m after drying.

The light-emitting beads were ZnS fluorescent particles (trade name: S-728 manufactured by OSRAM Sylvania; average particle size, about 23 $\mu$m). The transparent beads had a particle size of about 53 $\mu$m and a refractive index of about 2.3.

Next, a coating composition for the second polymer layer, which had the same composition as that of the paint for the first polymer layer, was applied to cover the optical particle layer, and dried at about 65° C. for about one minute to form the second polymer layer. Thereby, the second polymer layer having a surface which substantially followed the focal plane of the above glass beads was formed.

The optical layer comprising the first polymer layer, bead monolayer, and second polymer layer had the closely bonded structure having no bubbles at any interface. The total thickness of the optical layer was 45 $\mu$m after drying.

Finally, an electrically conductive reflective layer made of aluminum was formed on the surface of the second polymer layer (the focal plane of the glass beads) by vacuum deposition, using a vacuum deposition apparatus "EBV-6DA" (manufactured by Ulvac) under reduced pressure of $10^{-5}$ Torr or less for 5 seconds.

The luminous characteristics of the sheet were then tested. Terminal wires were attached respectively to the transparent electrode layer and the electrically conductive reflective layer of the retroreflective sheet of this Example, which had been prepared by cutting the sheet in a square of 100 mm×100 mm, and connected to a power source ("PCR 500L" manufactured by Kikusui Electronic Industries, Ltd.). The power source generated an alternating voltage of 100 Vrms, 400 Hz (condition 1) and 120 Vrms, 600 Hz (condition 2) between the terminal wires. The light was emitted brightly and uniformly all over the light-emitting surface of the sheet.

The luminance (self light-emitting luminance) was then measured, and the results are shown in Table 1. The luminance was measured by placing the retroreflective sheet in a dark room, and measuring a luminance at a distance of 1 meter from the surface of the PET film using a conventional luminance meter ("LS 110" manufactured by Minolta).

The retroreflective brightness, in cd/lux/m², of the retroreflective sheet of this Example was measured when the electrical power was turned off, according to JIS Z 8714 using an apparatus "MODEL 920" manufactured by Gamma Scientific. These results are also shown in Table 1.

The results showed that the retroreflective sheet of this Example achieved a satisfactory self light-emitting luminance and retroreflective brightness.

For purposes of comparison, a retroreflective sheet was produced ("Comparative Example 1") in the same manner as in Example 1 except that only luminescent beads, not simple transparent beads, were used. The light-emitting luminance and retroreflective luminance of this comparison sheet were measured. The results are shown in Table 1.

TABLE 1

|  | Volume Ratio | Light-emitting luminance (cd/m²) | | Retroreflective brightness (cd/lux/m²) |
| --- | --- | --- | --- | --- |
|  |  | 100 V/400 Hz | 120 V/600 Hz |  |
| Example 1 | 48:52 | 42.5 | 72.7 | 6.8 |
| Comp. Ex. 1 | 0:100 | 52.5 | 105.7 | 0 |
| Example 2 | 30:70 | 56.81 |  | 2.6 |
| Example 3 | 50:50 | 49.38 |  | 8.2 |
| Example 4 | 70:30 | 40.31 |  | 9.2 |

EXAMPLES 2–4

Sheetings similar to that of Example 1 were made, except that the transparent beads used had a diameter of about 30 $\mu$m rather than 53$\mu$m, and different volume ratios of transparent beads to light-emitting beads were used. Light-emitting luminance was measured with an alternating voltage of 100 Vrms @ 400 Hz (condition 1). The results, also shown in Table 2, demonstrate the utility of the constructions.

Glossary of Selected Terms

"Focal plane" of a monolayer of beads means the surface defining the position where incident light of a given wavelength comes to a focus, taking into account any transparent materials in close proximity to the beads that may affect their focusing power. Such surface need not be planar.

"Light" means electromagnetic radiation, whether or not visible.

"Light transmission" of a layer refers to the percentage of normally incident light that remains after one pass through the layer. Light having a wavelength of about 550 nm is generally used, although other design wavelengths are also possible. Various conventional spectrophotometers, including the one known as "U Best V-560" manufactured by Nippon Bunko Kabushikikaisha, can be used in the measurement of light transmission.

A "monolayer" of beads means a layer in which, at any given point along the layer, substantially only a single bead is disposed in the layer along a direction perpendicular to the layer at the given point.

All patents and patent applications referred to herein are incorporated by reference. Although the present invention has been described with reference to preferred embodiments, workers skilled in the art will recognize that changes can be made in form and detail without departing from the spirit and scope of the invention.

What is claimed is:

1. A luminous retroreflective sheet, comprising:

a transparent cover layer;

an optical layer disposed beneath the cover layer and comprising a first polymer layer and a monolayer of beads at least partially embedded therein; and a reflective layer disposed proximate a focal plane of the monolayer of beads;

wherein the monolayer of beads includes transparent beads that in combination with the reflective layer retroreflect incident light, and light-emitting beads that emit light under the influence of an external agent.

2. The sheet of claim 1, wherein the transparent beads and the light-emitting beads are present in the monolayer in relative amounts between about 10 and 90% in volume ratio.

3. The sheet of claim 2, wherein the light-emitting beads and the transparent beads have similar sizes.

4. The sheet of claim 2, wherein the light-emitting beads are electro-luminescent.

5. The sheet of claim 4, wherein the cover layer comprises a transparent electrode layer, and wherein the reflective layer is electrically conductive.

6. The sheet of claim 5, wherein the first polymer layer separates the monolayer of beads from the reflective layer, and the reflective layer is dimpled in conformance with the monolayer of beads.

7. The sheet of claim 5, wherein the optical layer further comprises a second polymer layer, the monolayer of beads being partially embedded in the first polymer layer and partially embedded in the second polymer layer, the first and second polymer layers each having dielectric constants measured at 1 kHz of at least 5.

8. The sheet of claim 7, wherein the first and second polymer layers each have dielectric constants measured at 1 kHz of between about 8 and 18.

9. A method of making a luminous retroreflective sheeting, comprising:

providing a first coating composition containing a first polymer;

scattering beads in a monolayer on the first coating composition;

solidifying the first coating composition to form a first polymer layer with the monolayer of beads at least partially embedded therein; and forming a reflective film substantially along a focal plane of the monolayer of beads;

wherein the scattering step comprises scattering both transparent beads that in combination with the reflective layer retroreflect incident light, and light-emitting beads that emit light under the influence of an external agent.

10. The method of claim 9, wherein the transparent beads and light-emitting beads are present in the monolayer in relative amounts between about 10 and 90% in volume ratio.

11. The method of claim 9, wherein the forming step comprises applying a second coating composition containing a second polymer to exposed portions of the monolayer of beads, solidifying the second coating composition to form a second polymer layer having a surface disposed substantially at a focal plane of the monolayer of beads, and applying the reflective film to such surface of the second polymer layer.

12. The method of claim 11, wherein the providing step comprises providing a transparent substrate having a transparent electrode, and applying the first coating composition to the transparent substrate.

13. The method of claim 9, wherein the forming step comprises applying the reflective film at least to embedded surfaces of the transparent beads prior to the scattering step.

* * * * *